United States Patent
Xu

(10) Patent No.: US 12,150,058 B2
(45) Date of Patent: Nov. 19, 2024

(54) SIGNAL MONITORING METHOD, SIGNAL SENDING METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 326 days.

(21) Appl. No.: 17/652,303

(22) Filed: Feb. 24, 2022

(65) Prior Publication Data
US 2022/0182939 A1     Jun. 9, 2022

Related U.S. Application Data

(63) Continuation of application No. PCT/CN2019/116809, filed on Nov. 8, 2019.

(51) Int. Cl.
H04W 52/00     (2009.01)
H04W 52/02     (2009.01)
(Continued)

(52) U.S. Cl.
CPC ... *H04W 52/0232* (2013.01); *H04W 52/0216* (2013.01); *H04W 72/0446* (2013.01); *H04W 72/23* (2023.01)

(58) Field of Classification Search
CPC ......... H04W 52/0232; H04W 52/0216; H04W 72/23; H04W 72/0446
See application file for complete search history.

(56) References Cited

U.S. PATENT DOCUMENTS 9,504,012 B1    11/2016  Ljung et al.
2016/0128129 A1  5/2016  Kahtava et al.
(Continued)

FOREIGN PATENT DOCUMENTS

CN    101547501 A    9/2009
CN    109429258 A    3/2019
(Continued)

OTHER PUBLICATIONS

LG Electronics, "Discussion on PDCCH-Based Power Saving Signal/Channel", 3GPP TSG RAN WG1#98bis, R1-1910834, Oct. 20, 2019 (Oct. 20, 2019).
(Continued)

*Primary Examiner* — Erika A Washington
(74) *Attorney, Agent, or Firm* — PERKINS COIE LLP

(57) ABSTRACT

Provided are a signal monitoring method, a signal sending method, a terminal device, a network device, a chip, a computer-readable storage medium, a computer program product, and a computer program. The signal monitoring method includes that: a terminal device monitors a Power Saving (PS) signal Physical Downlink Control Channel (PDCCH) in one or more than one monitoring time period prior to a Discontinuous Reception (DRX) ON time period and after a monitoring starting time point. The one or more than one monitoring time period is determined by at least one configuration parameter of each PS signal search space of K PS signal search spaces, K being an integer more than or equal to 1.

28 Claims, 9 Drawing Sheets

(51) Int. Cl.
*H04W 72/0446* (2023.01)
*H04W 72/23* (2023.01)

(56) References Cited

U.S. PATENT DOCUMENTS

| | | | |
|---|---|---|---|
| 2016/0345292 A1 | 11/2016 | Ljung et al. | |
| 2020/0245333 A1* | 7/2020 | Lin | H04W 72/53 |
| 2020/0351786 A1* | 11/2020 | Koskela | H04W 52/0235 |
| 2021/0007050 A1 | 1/2021 | Lin | |

FOREIGN PATENT DOCUMENTS

| | | |
|---|---|---|
| CN | 109496446 A | 3/2019 |
| CN | 109963339 A | 7/2019 |
| JP | 2021013163 A | 2/2021 |
| WO | 2018203822 A1 | 11/2018 |
| WO | 2019182428 A1 | 9/2019 |

OTHER PUBLICATIONS

Apple Inc, "PDCCH Based Power Saving Channel Design for UE Power Saving", 3GPP TSG RAN WG1#98b, R1-1910972, Oct. 18, 2019 (Oct. 18, 2019).

International Search Report in the international application No. PCT/CN2019/116809, mailed on Jul. 27, 2020.

First Office Action of the European application No. 19951889.5, issued on Mar. 30, 2023. 7 pages.

First Office Action of the Chinese application No. 202111616417.7, issued on Mar. 31, 2023. 20 pages with English translation.

Qualcomm Incorporated: "PDCCH-based power saving channel design", 3GPP Draft; R1-1911129, vol. RAN WG1, No. Chongqing, China; Oct. 5, 2019 (Oct. 5, 2019), XP051808852. 9 pages.

MTI: "Remaining issues on Beam Management", 3GPP Draft; R1-1813245, vol. RAN WG1, No. Spokane, Washington, USA; Nov. 11, 2018 (Nov. 11, 2018), XP051555248. 5 pages.

Supplementary European Search Report in the European application No. 19951889.5, mailed on Jul. 6, 2022. 14 pages.

Office Action of the Indian application No. 202227010251, issued on Jul. 13, 2022. 8 pages with English translation.

3GPP TS 38.214 V15.1.0, "3rd Generation Partnership Project;Technical Specification Group Radio Access Network; NR; Physical layer procedures for data (Release 15)", Technical Specification, (Mar. 2018). 77 pages.

3GPP TS 38.331 V15.7.0, "3rd Generation Partnership Project; Technical Specification Group Radio Access Network; NR; Radio Resource Control (RRC) protocol specification (Release 15)", Technical Specification, (Aug. 2019). 526 pages.

CATT "Study on UE Power Saving in NR" , 3GPP TSG RAN meeting #86 RP-192854 Sitges, Spain, Dec. 9-12, 2019. 17 pages.

OPPO, "Remaining issues for Power saving signal", 3GPP TSG RAN WG1 #100-E R1-2000478, Athens, Greece, Feb. 24-28, 2020. 5 pages.

Panasonic, "Discussion on PDCCH-based power saving signal/channel (PoSS)", 3GPP TSG RAN WG1 #98bis R1-1910597, Chongqing, China, Oct. 14-20, 2019. 11 pages.

Written Opinion of the International Search Authority in the international application No. PCT/CN2019/116809, mailed on Jul. 27, 2020. 8 pages with English translation.

First Office Action of the Japanese application No. 2022-514850, issued on Oct. 31, 2023, 6 pages with English translation.

Huawei, HiSilicon, "Correction on PDCCH selection among different QCL-TypeD property", 3GPP TSG RAN WG1 #96 R1-1903205, Feb. 25-Mar. 1, 2019, the whole document, 3 pages.

MediaTek Inc., "Ramaining details on power saving signal/channel", 3GPP TSG RAN WG1 Meeting #98bis, R1-1911057, Chongqing, China, Oct. 14-20, 2019, the whole document, 12 pages.

Huawei, HiSilicon, "PDCCH-based power saving signal/channel", 3GPP TSG RAN WG1 Meeting #98bis R1-1910076, Chongqing, China, Oct. 14-20, 2019, the whole document, 21 pages.

Search Report by Registered Search Organization of the Japanese application No. 2022-514850, issued on Sep. 26, 2023, 34 pages with English translation.

Notice of Rejection of the Japanese application No. 2022-514850, issued on May 7, 2024, 6 pages with English translation.

CATT, "List of Higher Layer Parameters for UE Power Saving in NR", 3GPP TSG RAN WG1 Meeting#98bis, R1-1911733, Oct. 14-20, 2019, the whole document, 3 pages.

* cited by examiner

A terminal device monitors a PS signal PDCCH in a monitoring time period prior to a DRX ON time period and after a monitoring starting time point ⟋21

A network device sends a PS signal PDCCH in a monitoring time period prior to a DRX ON time period and after a monitoring starting time point ⟋31

SIGNAL MONITORING METHOD, SIGNAL SENDING METHOD, TERMINAL DEVICE AND NETWORK DEVICE

CROSS REFERENCE TO RELATED APPLICATION

This application is a continuation application of International Patent Application No. PCT/CN2019/116809 filed on Nov. 8, 2019, the disclosure of which is incorporated herein by reference in its entirety.

TECHNICAL FIELD

The disclosure relates to the technical field of information processing, and particularly to a signal monitoring method, a signal sending method, a terminal device, a network device, a chip, a computer-readable storage medium, a computer program product, and a computer program.

BACKGROUND

A 5th-Generation (5G) technology is researched and standardized to endow wireless broadband mobile communication with a higher peak rate, a greater transmission bandwidth, and a lower transmission latency. However, some problems in implementation and specific use are also brought to a terminal device, which may affect the standby time point and service time point of a 5G terminal device and even the battery life of the terminal device. Therefore, the 3rd Generation Partnership Project (3GPP) has discussed and approved the adoption of a Physical Downlink Control Channel (PDCCH) for a Power Saving (PS) signal.

However, there has yet not been a specific method for determining a monitoring time period of a PS signal PDCCH.

SUMMARY

For solving the foregoing technical problem, embodiments of the disclosure provide a signal monitoring method, a signal sending method, a terminal device, a network device, a chip, a computer-readable storage medium, a computer program product, and a computer program.

A first aspect provides a signal monitoring method, which may include that a terminal device monitors a PS signal PDCCH in one or more than one monitoring time period prior to a Discontinuous Reception (DRX) ON time period and after a monitoring starting time point. The one or more than one monitoring time period may be determined by at least one configuration parameter of each PS signal search space of K PS signal search spaces, K being an integer more than or equal to 1.

A second aspect provides a terminal device, which may include a first communication unit that is configured to monitor a PS signal PDCCH in one or more than one monitoring time period prior to a DRX ON time period and after a monitoring starting time point. The one or more than one monitoring time period may be determined by at least one configuration parameter of each PS signal search space of K PS signal search spaces, K being an integer more than or equal to 1.

A third aspect provides a signal sending method, which may include that a network device sends a PS signal PDCCH in one or more than one monitoring time period prior to a DRX ON time period and after a monitoring starting time point. The one or more than one monitoring time period may be determined by at least one configuration parameter of each PS signal search space of K PS signal search spaces, K being an integer more than or equal to 1.

A fourth aspect provides a network device, which may include a second communication unit that is configured to send a PS signal PDCCH in one or more than one monitoring time period prior to a DRX ON time period and after a monitoring starting time point. The one or more than one monitoring time period may be determined by at least one configuration parameter of each PS signal search space of K PS signal search spaces, K being an integer more than or equal to 1.

A fifth aspect provides a terminal device, which may include a processor and a memory configured to store a computer program capable of running in the processor. The memory may be configured to store a computer program. The processor may be configured to call and run the computer program stored in the memory to execute the steps of the abovementioned method.

A sixth aspect provides a network device, which may include a processor and a memory configured to store a computer program capable of running in the processor. The memory may be configured to store a computer program. The processor may be configured to call and run the computer program stored in the memory to execute the steps of the abovementioned method.

A seventh aspect provides a chip, which may include a processor configured to call and run a computer program in a memory to enable a device installed with the chip to execute the method as described in the first aspect.

An eighth aspect provides a computer-readable storage medium storing a computer program which enables a computer to execute the steps of the abovementioned methods.

A ninth aspect provides a computer program product, including a computer program instruction which enables a computer to execute the abovementioned methods.

A tenth aspect provides a computer program, enabling a computer to execute the abovementioned methods.

With the adoption of the solutions, a corresponding monitoring time period may be determined based on at least one configuration parameter of a PS signal search space to further monitor a PS signal PDCCH in the monitoring time period. As such, a solution to determination of a monitoring time period of a PS signal using a configuration parameter is provided, and a gap in related art is filled. Moreover, the solution may be performed without need of configuring any additional parameter based on existing parameters, so that the increase of signaling overheads between a terminal device and a network device is avoided.

DETAILED DESCRIPTION

In order to make the characteristics and technical contents of the embodiments of the disclosure understood in more detail, the implementation of the embodiments of the disclosure will be described below in combination with the drawings in detail. The drawings are only adopted for description as references and not intended to limit the embodiments of the disclosure.

The technical solutions in the embodiments of the application will be described below in combination with the drawings in the embodiments of the application. It is apparent that the described embodiments are not all but part of embodiments of the application. All other embodiments obtained by those of ordinary skill in the art based on the embodiments in the application without creative work shall fall within the scope of protection of the application.

The technical solutions of the embodiments of the application may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Figures 1, 2A, 2B:
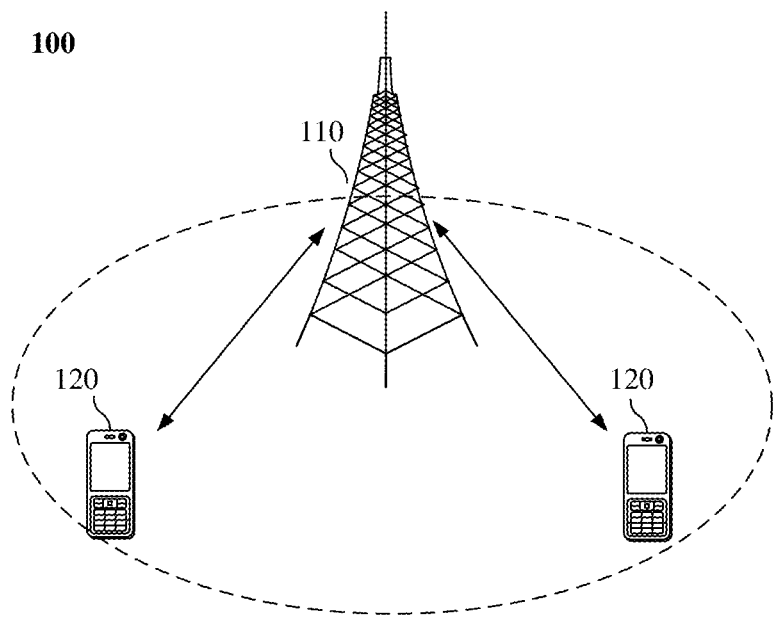
FIG. 1 is a first schematic diagram of an architecture of a communication system according to an embodiment of the disclosure.
FIG. 2A is a flowchart of a signal monitoring method according to an embodiment of the disclosure.
FIG. 2B is a flowchart of a signal sending method according to an embodiment of the disclosure.

As an example, a communication system 100 to which the embodiments of the application are applied may be as shown in FIG. 1. The communication system 100 may include a network device 110. The network device 110 may be a device communicating with User Equipment (UE) 120 (or called a communication terminal and a terminal). The network device 110 may provide a communication coverage for a specific geographical region and communicate with UE in the coverage. Optionally, the network device 110 may be a Base Transceiver Station (BTS) in the GSM or the CDMA system, or may be a NodeB (NB) in the WCDMA system, or may be an Evolutional Node B (eNB or eNodeB) in the LTE system or a wireless controller in a Cloud Radio Access Network (CRAN). Alternatively, the network device may be a mobile switching center, a relay station, an access point, a vehicle device, a wearable device, a hub, a switch, a network bridge, a router, a network-side device in a future 5G network, a network device in a future evolved Public Land Mobile Network (PLMN), or the like.

The communication system 100 may further include at least one UE 120 within the coverage of the network device 110. As used herein, the "UE" includes, but not limited to, a device configured to receive/send a communication signal through a wired line connection, for example, through Public Switched Telephone Network (PSTN), Digital Subscriber Line (DSL), digital cable and direct cable connections, and/or another data connection/network, and/or through a wireless interface, for example, for a cellular network, a Wireless Local Area Network (WLAN), a digital television network like a Digital Video Broadcasting-Handheld (DVB-H) network, a satellite network, and an Amplitude Modulated (AM)-Frequency Modulated (FM) broadcast transmitter, and/or another piece of UE, and/or an Internet of Things (IoT) device. The UE configured to communicate through a wireless interface may be called a "wireless communication terminal", a "wireless terminal", or a "mobile terminal."

Optionally, Device to Device (D2D) communication may be performed between the UEs 120.

It is to be understood that terms "system" and "network" in the disclosure may usually be interchanged in the disclosure. In the disclosure, term "and/or" is only an association relationship describing associated objects and represents that three relationships may exist. For example, A and/or B may represent three conditions: i.e., independent existence of A, existence of both A and B, and independent existence of B. In addition, character "/" in the disclosure usually represents that previous and next associated objects form an "or" relationship.

In order to make the characteristics and technical contents of the embodiments of the disclosure understood in more detail, the implementation of the embodiments of the disclosure will be described below in combination with the drawings in detail. The drawings are only adopted for description as references and not intended to limit the embodiments of the disclosure.

An embodiment of the disclosure provides a signal monitoring method, which, as shown in FIG. 2A, includes the following operation.

In an operation 21, a terminal device monitors a PS signal PDCCH in a monitoring time period prior to a DRX ON time period and after a monitoring starting time point.

The monitoring time period may be determined by at least one configuration parameter of each PS signal search space of K PS signal search spaces, K being an integer more than or equal to 1.

Correspondingly, an embodiment of the disclosure also provides a signal sending method, which as shown in FIG. 2B, includes the following operation.

In an operation 31, a network device sends a PS signal PDCCH in a monitoring time period prior to a DRX ON time period and after a monitoring starting time point.

The monitoring time period may be determined by at least one configuration parameter of each PS signal search space of K PS signal search spaces, K being an integer more than or equal to 1.

The PS signal search space is a PDCCH search space. Specifically, a terminal device may monitor a PDCCH in a PDCCH search space in New Radio (NR). A configuration parameter of the PDCCH search space is usually notified to the terminal device by the network device through Radio Resource Control (RRC) signaling.

With respect to the related descriptions about the PS signal PDCCH, the PS signal PDCCH may be configured to wake up the terminal device to detect the PDCCH, and may further be configured to indicate PS indication information such as a target Bandwidth Part (BWP) used when the terminal device is woken up, a configuration of the used PDCCH search space, and Secondary Cell (Scell) dormancy indication information.

A PS signal may be Downlink Control Information (DCI) born in the PDCCH. For example, the PS signal may be DCI format 3_0.

It is to be noted that bearing the PS signal in the PDCCH has the following advantages.

1: The PDCCH design may be directly multiplexed, including coding, scrambling, resource mapping, search spaces, Control Resource Set (CORESET) and other aspects. Therefore, the workload in standardization is relatively low; and 2: High compatibility with transmission of other signals is achieved in terms of the multiplexing characteristic. Since the system supports a PDCCH, the PDCCH is highly compatible with each of other channels, e.g., a Physical Downlink Shared Channel (PDSCH), in terms of the multiplexing characteristic.

With respect to the monitoring starting time point, the terminal device may determine the monitoring starting time point based on a configured PS-offset and a starting time point of the DRX ON time period.

Specifically, the configured PS-offset may be configured for the terminal device by the network device through RRC signaling, and of course, may also be predefined. Determining the monitoring starting time point based on the starting time point of the DRX ON time period and the PS-offset may specifically be determining a time point obtained by subtracting the PS-offset from the starting time point of the DRX ON time period as the monitoring starting time point.

Figure 3A:
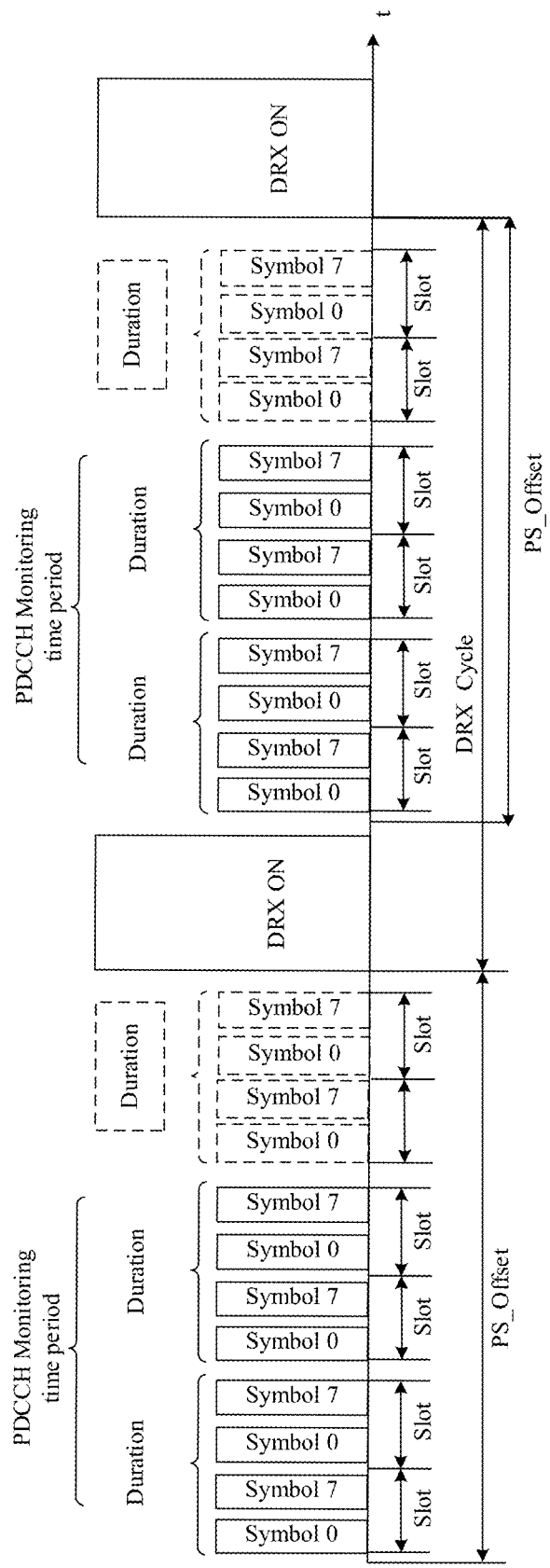
FIG. 3A to FIG. 3F are some schematic diagrams of a monitoring time period according to an embodiment of the disclosure.

Referring to FIG. 3A, the left DRX ON in the figure is taken as an example. A starting time point of the DRX ON time period is determined as a reference time point, and a PS-offset is subtracted to obtain a monitoring starting time point of a PDCCH monitoring time period.

The DRX ON time period is a time period between a starting time point of a time point and an ending or expiration time point of the time point when the terminal starts the "ON duration" time point at a starting position of a DRX cycle. For example, references may be made to FIG. 3A, where a coverage of a DRX ON illustrated in the block on a time point axis may be a DRX ON time period.

The embodiment may be applied to a scenario that the terminal device is configured with one PS signal search space, and may also be applied to a scenario that the terminal device is configured with multiple PS signal search spaces. The solution provided in the embodiment will now be described in combination with multiple examples.

Example 1: K=1, namely the terminal device is configured with one PS signal search space.

In the example, the monitoring time period may include M durations in each PS signal search space of the K PS signal search spaces, M being an integer more than or equal to 1.

Since the example is for the scenario that K=1, the monitoring time period in the example includes M durations for the configured PS signal search space.

M may be configured or predefined. When M is configured, the terminal device may receive M value configured for the terminal device by the network device. Specifically, the M value may be contained in RRC signaling. Preferably, M=1.

It is also to be pointed out that, in the example, the inclusion of the M durations into the monitoring time period may refer to that a length of the monitoring time period is equal to a sum of the M durations or a length of the monitoring time period is greater than the sum of the M durations. In such case, it may be considered that the monitoring time period may further include an interval between adjacent durations or other duration than the durations, etc., in addition to a length of each duration.

Each duration in the M durations may include at least one monitoring time.

The terminal device may determine a corresponding monitoring time period based on at least one configuration parameter of a PS signal search space. The at least one configuration parameter in the PS signal search space, i.e., a PDCCH search space, may include at least one of:

a first parameter configured to indicate the number of continuous monitoring slots in a cycle of a corresponding PS signal search space; or a second parameter configured to indicate a starting symbol of a PS signal PDCCH monitoring time in a corresponding PS signal search space.

Here, the first parameter may be parameter "Duration" in the PDCCH search space, and the second parameter may be parameter "monitoringSymbolsWithinSlot" in the PDCCH search space.

For example, the length of a duration may be determined based on the first parameter. The second parameter may be configured to determine a starting symbol where monitoring is started.

Specifically, it may be determined based on the first parameter that each duration includes multiple slots. The second parameter may include a bitmap which may indicate a starting symbol of each monitoring time. In other words, the number of monitoring times may be determined based on the bitmap. For example, when the bitmap indicates "1001001", it may be considered that a monitoring time starts from a first symbol, a fourth symbol is also a starting symbol of a monitoring time, and a seventh symbol is also a starting symbol of a monitoring time. Furthermore, the number of monitoring times corresponding to each starting symbol may be determined based on a CORESET. For example, two monitoring times may start from a first starting symbol, and two monitoring times may start from a fourth symbol.

It is also to be pointed out that the configuration parameter in the PS signal search space may further include another parameter in addition to the first parameter and the second parameter. For example, the following parameters may be included: a search Identity (ID); controlResourceSetId, configured to indicate an ID of a CORESET configuration and configure a time point-frequency resource of the PDCCH search space; a cycle of a monitoring slot and an offset in the cycle; configuration information of PDCCH candidates; and a search space type indication, indicating that the PDCCH search space is a Common Search Space (CSS) and a UE-Specific Space (USS). Of course, there may also be other configuration parameters, but exhaustions are omitted in the example.

In the example, the at least one monitoring time may be all monitoring times in a duration, or may be part of monitoring times in a duration.

The example illustrates in combination with FIG. 3A that a duration includes all monitoring times and M=2, namely there are two durations. Specifically, each duration is a complete duration, namely all PDCCH monitoring times in the duration are in the determined PDCCH monitoring time period. The terminal device may monitor the PDCCH at the PDCCH monitoring times in the two "durations" from the starting position, obtained based on PS_offset, for monitoring the PDCCH. The terminal does not monitor the PDCCH at the PDCCH monitoring time represented by the dotted line in FIG. 3A. In addition, for the conciseness, not all PDCCH monitoring positions in cycles of the PDCCH search spaces but only part of PDCCH monitoring positions prior to the DRX ON are illustrated in FIG. 3A, and this does not mean that the monitoring positions corresponding to the monitoring times can only be the positions illustrated in the figure.

Figure 3B:
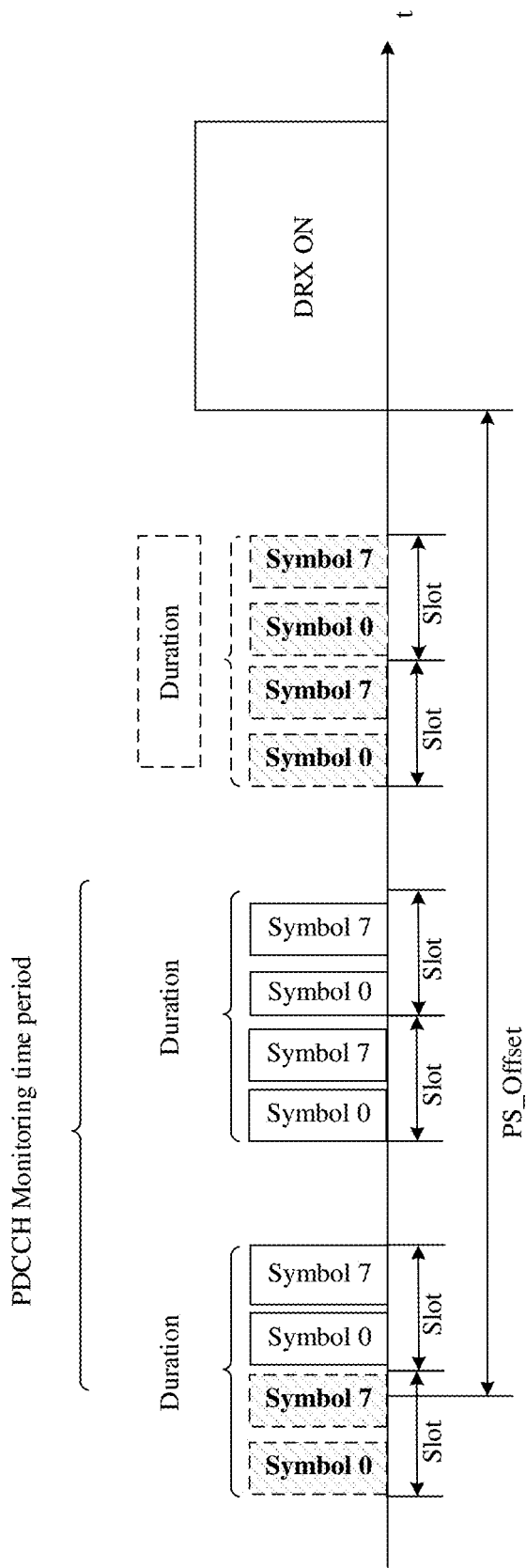

In combination with FIG. 3B which also illustrates M=2, namely taking two durations as an example, a duration includes part of monitoring times, namely an incomplete duration is included, but at least one PDDCH monitoring time is included. For example, a duration truncated by parameter PS_offset may also be counted as a duration. As shown in FIG. 3B, M=2. The terminal device may start monitoring the PDCCH from the starting position, obtained based on PS_offset, for monitoring the PDCCH. Monitoring is performed only at a PDCCH monitoring time after a starting monitoring time point indicated by PS_offset in a first duration. The monitoring time corresponding to the symbol of the shaded part in the figure is a portion that does not fall within the monitoring time period, and thus the PS signal PDCCH is not monitored at the corresponding time point.

In an example, each monitoring time in the at least one monitoring time is required to be a valid monitoring time.

With respect to the valid monitoring time, a definition rule for the validness may refer to the following description.

When the terminal device (e.g., an NR terminal) works in a single-cell operating or carrier aggregation state, and PDCCH monitoring times in PDCCH CORESETs monitored by the terminal device in active BWPs of one or more cells and having the same spatial Quasi-Colocation (QCL)-typeD attribute are overlapped, the terminal device may monitor the PS signal PDCCH at the monitoring time of only one CORESET in the active BWPs of the one or more cells, or the terminal device may monitor the PS signal PDCCH in any other CORESET having the same QCL-TypeD attribute as the CORESET. The CORESET satisfies the following condition that:

the CORESET includes a minimum-index CSS set of minimum-index cells in cells corresponding to CSSs.

When the CORESET does not include the minimum-index CSS set of the minimum-index cells in the cells of the CSSs, the CORESET includes a minimum-index USS set of minimum-index cells corresponding to USSs.

An index of the minimum-index USS set may be determined from all USS sets including at least one PDCCH candidate in overlapped PDCCH monitoring times.

Furthermore, the following definition may be further included: a Synchronization Signal (SS)/Physical Broadcast Channel (PBCH) block is considered to have a different QCL-typeD attribute from a Channel State Information-Reference Signal (CSI-RS).

A CSI-RS associated with an SS/PBCH block in a first cell and a second CSI-RS associated with the same SS/PBCH block in a second cell are considered to have the same QCL-TypeD attribute.

Conversely, when a terminal device is configured to work in a single-cell operating or carrier aggregation operating state and monitor the PDCCH in multiple overlapped PDCCH CORESETs having no QCL-TypeD attributes, the terminal device is required to monitor the PDCCH at PDCCH monitoring times corresponding to the CORESETs in overlapped PDCCH monitoring times. That is, in such case, all the monitoring times corresponding to the CORESETs may be valid monitoring times.

That is, in combination with the above description about the validness, a duration including at least one valid monitoring time may be counted as a duration.

In combination with an example about validness, it may further be considered that, when a duration does not include any valid monitoring time, the duration may not be counted, determination regarding whether a next duration includes at least one valid monitoring time may be performed from the next duration so as to determine whether to count the next duration. Such processing may be performed cyclically until all durations in the present monitoring time period are ended.

Example 2: unlike example 1, descriptions are made for the condition of K>1. That is, a solution when the terminal device is configured with multiple PS signal search spaces for the monitoring of a PDCCH-based PS signal (i.e., a PS signal PDCCH) is provided.

According to the solution provided in the example, the terminal device may determine M durations in a monitoring time period corresponding to each PS signal search space based on at least one configuration parameter corresponding to each PS signal search space in the K PS signal search spaces (specifically PDCCH search spaces).

Like example 1, M may be configured or predefined. When M is configured, the terminal device may receive M value configured for the terminal device by the network device. Specifically, the M value may be contained in RRC signaling. Preferably, M=1.

Unlike example 1, there are multiple PS signal search spaces when K is greater than 1, namely the monitoring time period finally includes K*M durations.

It is also to be pointed out that the durations of different PS signal search spaces in the K*M durations may be overlapped, and thus a total duration may be determined based on the K*M durations. For example, the first PS signal search space in two PS signal search spaces may include four durations corresponding to slots 1, 3, 5, and 7, and the second PS signal search space may include four durations corresponding to slots 3, 5, 7, and 9. In such case, a maximum duration may be determined, of which a starting time point may be a starting time point of slot 1 and an ending time point may be an ending time point of slot 9.

Of course, when the monitoring times of the durations of different PS signal search spaces are not overlapped, it may be considered that the monitoring time period includes K*M durations, or a total duration may be determined based on the K*M durations. For example, durations in a first PS signal search space correspond to slots 1 and 3, and durations in a second PS signal search space include slots 2 and 4. In such case, it may be considered that the monitoring time period includes slots 1, 2, 3, and 4. Alternatively, it may be considered that a starting time point of a duration in the monitoring time period is a starting time point of slot 1 and ending time point is an ending time point of slot 4.

A manner for determining the M durations in each PS signal search space in the example is the same as that in example 1. In addition, the related descriptions that each duration in each PS signal search space includes at least one monitoring time (or at least one valid monitoring time), etc., are also the same as those in example 1, and thus repeated descriptions are omitted in the example.

Example 3: descriptions are also made for the condition of K>1. That is, a solution when the terminal device is configured with multiple PS signal search spaces for the monitoring of a PDCCH-based PS signal (i.e., a PS signal PDCCH) is provided.

Unlike example 2, the monitoring time period in the example includes M durations, M being an integer more than or equal to 1. That is, all the K PS signal search spaces may correspond to the same M durations. For example, all the K PS signal search spaces adopt the same duration in case of M=1.

A length of each duration in the M durations may be one of:

a length of a maximum duration in at least one duration of the K PS signal search spaces;

a preset time point length;

a preset multiple of the maximum duration in the at least one duration of the K PS signal search spaces; or a preset multiple of the preset time point length.

Specifically, the length of the maximum duration in the at least one duration of the K PS signal search spaces may include the following contents.

A length of a duration of each PS signal search space is determined first based on the at least one configuration parameter of each PS signal search space. Then, the length of the maximum duration is selected from multiple durations corresponding to the K PS signal search spaces as a length of a finally adopted duration in the example.

A manner for determining a length of a duration based on at least one configuration parameter of each PS signal search space is the same as that in example 1, and will not be elaborated herein. Correspondingly, a manner for determining at least one monitoring time after determination of a duration is also the same as that in example 1, and will not be elaborated.

In the preset multiple of the maximum duration in the at least one duration of the K PS signal search spaces, the preset multiple may be predefined, or may be notified to the terminal device by the network device through RRC signaling. For example, in case of N=2, the finally determined length of each duration in the M durations is twice the determined maximum duration.

In addition, the preset time point length may also be predefined (for example, specified in a protocol or a default value), or may be carried and notified to the terminal device by the network device through the RRC signaling. With respect to the preset multiple of the preset time point length, the preset multiple may be predefined, or may be notified to the terminal device by the network device through the RRC signaling.

The related descriptions in the example that each duration includes at least one monitoring time (or at least one valid monitoring time), etc., are also the same as those in example 1, and thus repeated descriptions are omitted in the example.

Example 4: K=1, namely the terminal device is configured with one PS signal search space.

Unlike examples 1 to 3, the monitoring time period in the example includes N monitoring times in each PS signal search space of the K PS signal search spaces, N being an integer more than or equal to 1.

Since the example is for the scenario that K=1, the monitoring time period in the example includes N monitoring times for a configured PS signal search space.

N may be configured or predefined. When N is configured, the terminal device may receive the N value configured for the terminal device by the network device. Specifically, the N value may be contained in RRC signaling.

The terminal device may determine corresponding N monitoring times based on at least one configuration parameter of a PS signal search space. The at least one configuration parameter in the PS signal search space, i.e., a PDCCH search space, may include at least one of:

a first parameter configured to indicate the number of continuous monitoring slots in a cycle of the corresponding PS signal search space; or a second parameter configured to indicate a starting symbol of a PS signal PDCCH monitoring time in the corresponding PS signal search space.

Here, the first parameter may be parameter "Duration" in the PDCCH search space, and the second parameter may be parameter "monitoringSymbolsWithinSlot" in the PDCCH search space.

Specifically, the length of a duration may be determined based on the first parameter. The second parameter may be configured to determine a starting symbol where monitoring is started.

Furthermore, the second parameter may include a bitmap which may indicate a starting symbol of each monitoring time. In other words, the number of monitoring times may be determined based on the bitmap. For example, when the bitmap indicates "1001001", it may be considered that a monitoring time starts from a first symbol, a fourth symbol is also a starting symbol of a monitoring time, and a seventh symbol is also a starting symbol of a monitoring time. Furthermore, the number of monitoring times corresponding to each starting symbol may be determined based on a CORESET. For example, two monitoring times may start from a first starting symbol, and two monitoring times may start from a fourth symbol.

Figure 3C:
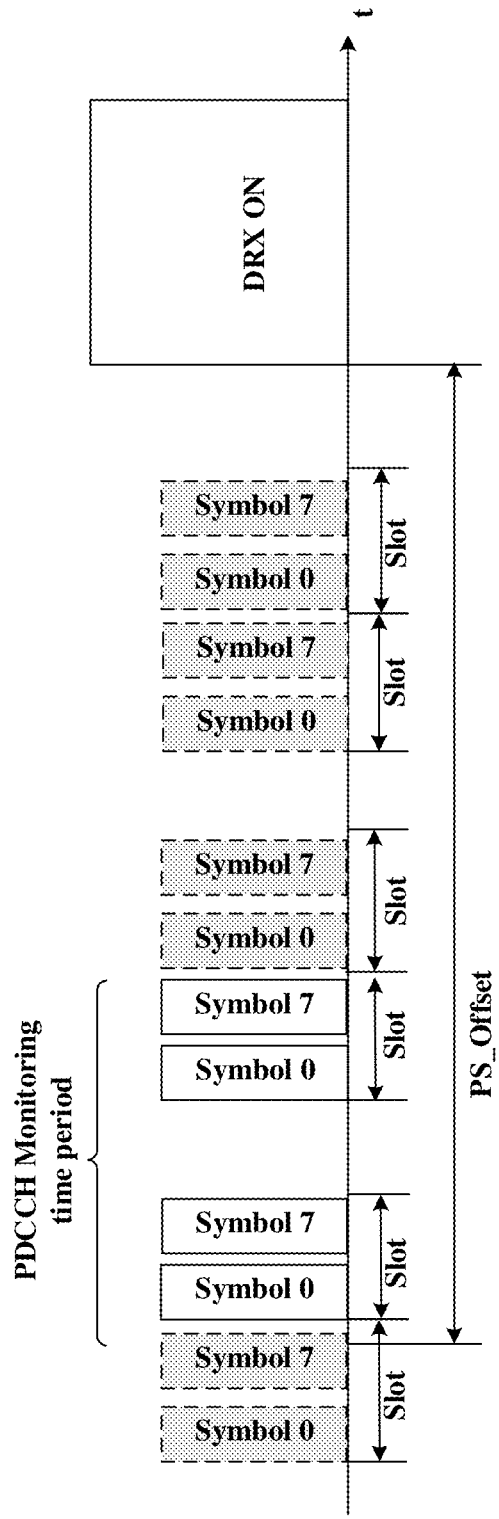

Descriptions are made in combination with FIG. 3C taking N=4 as an example. The monitoring time period includes N monitoring times. The terminal device may monitor the PDCCH from the monitoring starting time point, obtained based on PS_offset, for monitoring the PDCCH until completing monitoring the PDCCH at N=4 PDCCH monitoring times.

In an example, each monitoring time in the at least one monitoring time is required to be a valid monitoring time. Here, the definition about the validness in the valid monitoring time is the same as that in example 1, and will not be elaborated.

Figure 3D:
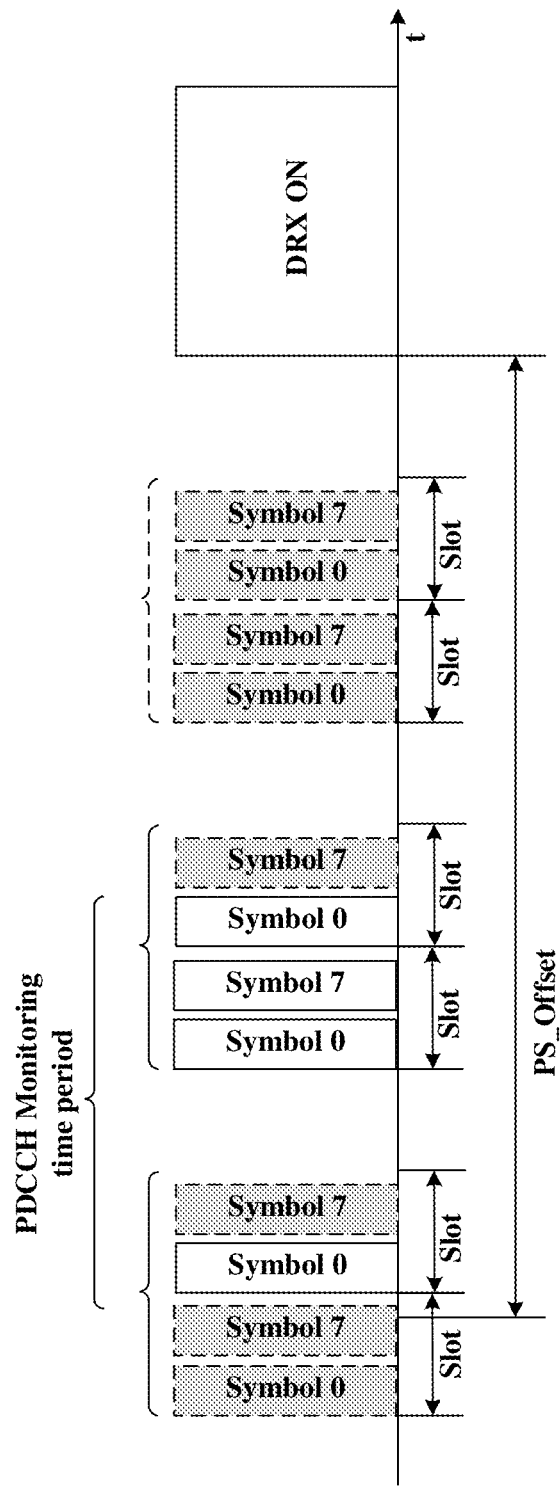

In combination with FIG. 3D where the monitoring time corresponding to a gray symbol is invalid or outside the monitoring time period, N=4 is taken as an example. After the starting position, obtained based on PS_offset, for monitoring the PDCCH, a first PDCCH monitoring position is a valid PDCCH monitoring position, but a second PDCCH monitoring position is an invalid monitoring time. Therefore, the terminal device is required to perform monitoring till a fifth monitoring time after the starting position, obtained based on PS_offset, for monitoring the PDCCH to obtain N=4 valid monitoring times.

Example 5: unlike example 4, descriptions are made for the condition of K>1. That is, a solution when the terminal is configured with multiple PS signal search spaces for the monitoring of a PDCCH-based PS signal (i.e., a PS signal PDCCH) is provided.

According to the solution provided in the example, the terminal device may determine N monitoring times in a monitoring time period corresponding to each PS signal search space based on at least one configuration parameter corresponding to each PS signal search space in the K PS signal search spaces (specifically PDCCH search spaces).

Like example 4, N may be configured or predefined.

Unlike example 1, there are multiple PS signal search spaces when K is greater than 1, namely the monitoring time period finally includes K*N monitoring times.

A manner for determining the N monitoring times in each PS signal search space in the example is the same as that in example 4. In addition, the related descriptions that the N monitoring times are valid monitoring times, etc., are also the same as those in example 4, and thus repeated descriptions are omitted in the example.

Example 6: descriptions are also made for the condition of K>1. That is, a solution when the terminal device is configured with multiple PS signal search spaces for the monitoring of a PDCCH-based PS signal (i.e., a PS signal PDCCH) is provided.

Unlike example 5, the monitoring time period in the example includes N monitoring times. That is, the same N monitoring times are adopted for monitoring no matter how many PS signal search spaces there are. Here, a method for determining the N monitoring times may include: randomly adopting N monitoring times (or, N valid monitoring times) in a monitoring time period in any PS signal search space or selecting some (one or more) of each monitoring time period in two or more PS signal search spaces to finally form N monitoring times. Of course, other manners may also be adopted, which will not be exhausted herein.

Example 7

Unlike all the above examples, the monitoring time period in the example includes L monitoring slots in each PS signal search space of the K PS signal search spaces, L being an integer more than or equal to 1.

The monitoring time period in the example includes L monitoring slots for a configured PS signal search space. Alternatively, in case that K is greater than 1, L monitoring slots are also determined for each PS signal search space, and the monitoring time period finally includes K*L monitoring slots.

L may be configured or predefined. When L is configured, the terminal device may receive L configured for the terminal device by the network device. Specifically, the L value may be contained in RRC signaling.

The terminal device may determine corresponding L monitoring slots based on at least one configuration parameter of a PS signal search space. The at least one configuration parameter in the PS signal search space, i.e., a PDCCH search space, may include at least one of:

a first parameter configured to indicate the number of continuous monitoring slots in a cycle of a corresponding PS signal search space; or a second parameter configured to indicate a starting symbol of a PS signal PDCCH monitoring time in a corresponding PS signal search space.

Here, the first parameter may be parameter "Duration" in the PDCCH search space, and the second parameter may be parameter "monitoringSymbolsWithinSlot" in the PDCCH search space.

The number of slots in a duration may be determined based on the first parameter. The second parameter may be configured to determine a starting symbol where monitoring is started.

Furthermore, the second parameter may include a bitmap which may indicate a starting symbol of each monitoring time. In other words, the number of monitoring times may be determined based on the bitmap. For example, when the bitmap indicates "1001001", it may be considered that, from a first symbol, both a fourth symbol and a seventh symbol are starting symbols. As such, multiple monitoring slots may further be determined based on each determined starting symbol.

Descriptions are made in combination with FIG. 3C taking L=2 as an example. The monitoring time period includes L monitoring slots. The terminal device may monitor the PDCCH from the monitoring starting time point, obtained based on PS_offset, for monitoring the PDCCH until completing monitoring the PS signal PDCCH in N=2 monitoring slots.

In an example, the monitoring times in the L monitoring slots are required to be valid monitoring times. Here, the definition about the validness in the valid monitoring time is the same as that in example 1, and will not be elaborated. Furthermore, if a monitoring time in a certain monitoring slot is invalid, the monitoring slot may not be counted.

Figure 3E:
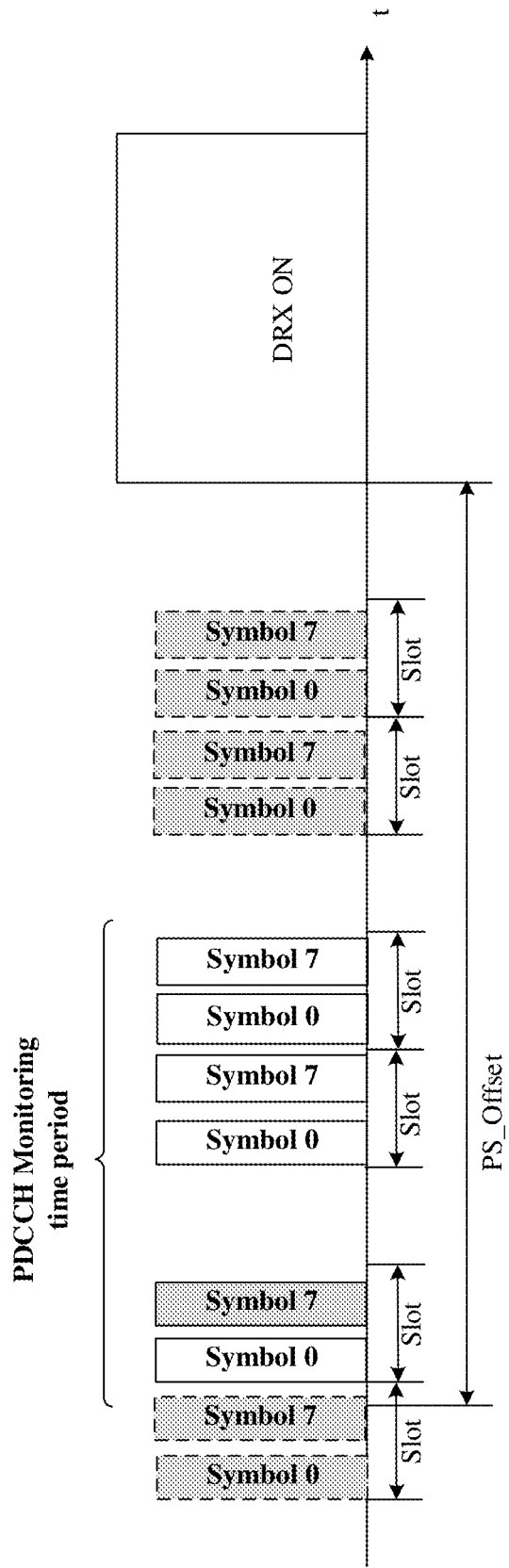

In combination with FIG. 3E where the monitoring time corresponding to the gray symbol is invalid or outside the monitoring time period, still taking L=2 as an example, a first monitoring slot after the starting position, obtained based on PS_offset, for monitoring the PDCCH includes a valid monitoring time. In such case, counting is started from a second monitoring slot. Therefore, the terminal device is required to perform monitoring till a third monitoring slot to obtain L=2 monitoring slots.

Example 8: unlike example 7, the monitoring time period includes L monitoring slots. That is, the same L monitoring slots are adopted for monitoring no matter how many PS signal search spaces there are. Here, a method for determining the L monitoring slots may include: randomly adopting L monitoring slots (or, N valid monitoring times) in a monitoring time period in any PS signal search space or selecting some (one or more) of each monitoring time period in two or more PS signal search spaces to finally form L monitoring slots. Of course, other manners may also be adopted, which will not be exhausted herein.

Example 9

Based on each above example, a third parameter is additionally introduced in the example. The terminal device may adjust the monitoring time period based on the third parameter to obtain an adjusted monitoring time period.

Specifically, the operation that the terminal device adjusts the monitoring time period based on the third parameter may further include that:

a monitoring time having a time interval away from a starting time point of the DRX ON time period being less than the third parameter in the monitoring time period is removed to obtain the adjusted monitoring time period.

That is, after the monitoring time period is obtained based on any one of examples 1 to 8, part of monitoring times may be removed from the monitoring time period based on the third parameter to obtain the adjusted monitoring time period.

Figure 3F:
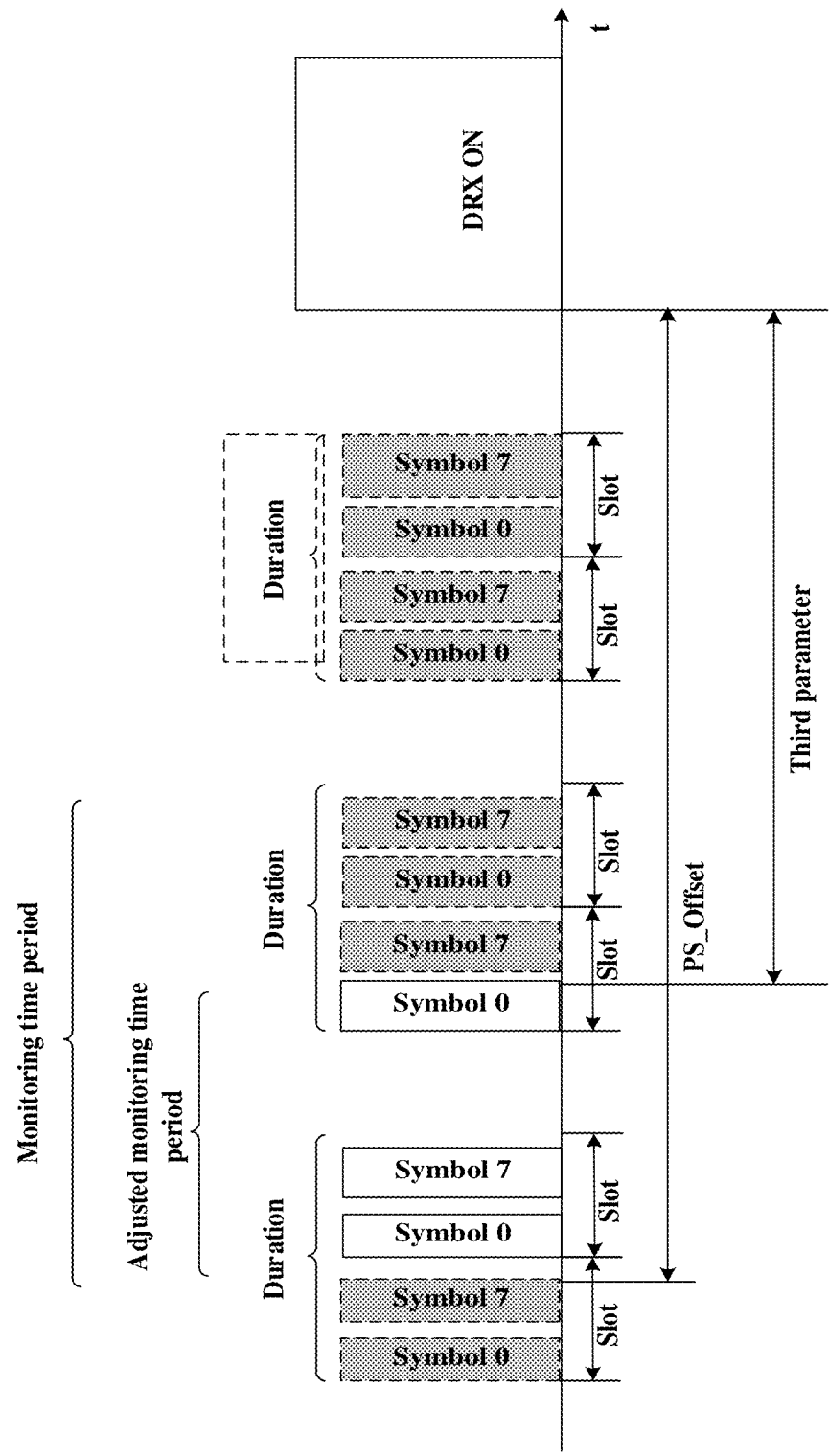

Specifically:

when the monitoring time period includes M durations, and each duration includes at least one monitoring time or each duration includes at least one valid monitoring time, one or more monitoring times (or valid monitoring times) in a certain duration may be removed after the monitoring time period is adjusted based on the third parameter. As shown in FIG. 3F, the original determined monitoring time period includes monitoring times in first and second durations. After adjustment is performed based on the third parameter, the gray monitoring times in the second duration are removed, and only the first monitoring time in the second duration remains. As shown in the figure, the adjusted monitoring time period includes part of monitoring times in the first duration and the monitoring time remaining after the gray monitoring times are removed from the second duration.

When the monitoring time period includes N monitoring times, one or more monitoring times (or valid monitoring times) may be removed after the monitoring time period is adjusted based on the third parameter.

When the monitoring time period includes L monitoring slots, one or more monitoring times (or valid monitoring times) in a certain monitoring slot may be removed after the monitoring time period is adjusted based on the third parameter.

The third parameter is configured to indicate shortest time required from the reception of the PS signal PDCCH by the terminal device to a starting time point of data transmission of the terminal device in the DRX ON time period (i.e., a time point when normal data transmission is started in the DRX ON time period). The third parameter may be recorded as PS_offsetMin. In addition, the third parameter may be preset, or configured by the network device for the terminal device, or specified in a protocol. Exhaustions are omitted herein.

The network device may adjust the monitoring time period based on the third parameter to obtain the adjusted monitoring time period no matter whether the third parameter is configured by the network side for the terminal device. Furthermore, the network device may determine the monitoring time period of the terminal device, thereby sending the PS signal PDCCH to the terminal device at a corresponding monitoring position.

It can be seen that, with the adoption of the solutions, a corresponding monitoring time period may be determined based on at least one configuration parameter of a PS signal search space to further monitor a PS signal PDCCH in the monitoring time period. As such, a solution to determination of a monitoring time period of a PS signal using a configuration parameter is provided, and a gap in related art is filled. Moreover, the solutions may be executed without need of configuring any additional parameter based on an existing parameter, so that the increase of a signaling overhead between the terminal device and the network device is avoided.

Figure 4A:
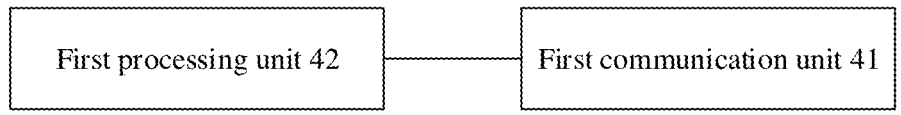
FIG. 4A is a composition structure diagram of a terminal device according to an embodiment of the disclosure.

An embodiment of the disclosure provides a terminal device, which, as shown in FIG. 4A, includes a first communication unit 41.

The first communication unit 41 is configured to monitor a PS signal PDCCH in a monitoring time period prior to a DRX ON time period and after a monitoring starting time point.

The monitoring time period may be determined by at least one configuration parameter of each PS signal search space of K PS signal search spaces, K being an integer more than or equal to 1.

The terminal device may further include a first processing unit 42 configured to determine the monitoring starting time point based on a configured PS-offset and a starting time point of the DRX ON time period.

Figure 4B:
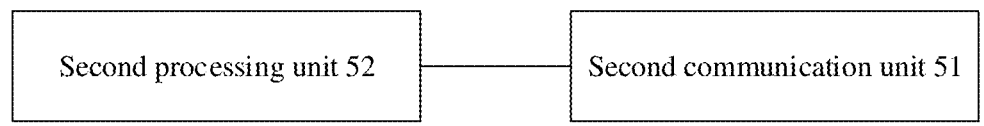
FIG. 4B is a composition structure diagram of a network device according to an embodiment of the disclosure.

A network device, as shown in FIG. 4B, includes a second communication unit 51.

The second communication unit 51 is configured to send a PS signal PDCCH in a monitoring time period prior to a DRX ON time period and after a monitoring starting time point.

The monitoring time period may be determined by at least one configuration parameter of each PS signal search space of K PS signal search spaces, K being an integer more than or equal to 1.

The network device may further include a second processing unit 52 configured to determine the monitoring starting time point based on a configured PS-offset and a starting time point of the DRX ON time period.

The embodiment may be applied to a scenario that the terminal device is configured with one PS signal search space, and may also be applied to a scenario that the terminal device is configured with multiple PS signal search spaces. The solution provided in the embodiment will now be described in combination with multiple examples.

Example 1: K=1, namely the terminal device is configured with one PS signal search space.

In the example, the monitoring time period may include M durations in each PS signal search space of the K PS signal search spaces, M being an integer more than or equal to 1.

Since the example is for the scenario that K=1, the monitoring time period in the example includes M durations for the configured PS signal search space.

M may be configured or predefined. When M is configured, the terminal device may receive the M value configured for the terminal device by the network device. Specifically, the M value may be contained in RRC signaling. Preferably, M=1.

Each duration in the M durations may include at least one monitoring time.

The terminal device may determine a corresponding monitoring time period based on at least one configuration parameter of a PS signal search space. The at least one configuration parameter in the PS signal search space, i.e., a PDCCH search space, may include at least one of:

a first parameter configured to indicate the number of continuous monitoring slots in a cycle of a corresponding PS signal search space; or a second parameter configured to indicate a starting symbol of a PS signal PDCCH monitoring time in a corresponding PS signal search space.

Here, the first parameter may be parameter "Duration" in the PDCCH search space, and the second parameter may be parameter "monitoringSymbolsWithinSlot" in the PDCCH search space.

In the example, the at least one monitoring time may be all monitoring times in a duration, or may be part of monitoring times in a duration.

In an example, each monitoring time in the at least one monitoring time is required to be a valid monitoring time.

Example 2: unlike example 1, descriptions are made for the condition of K>1. That is, a solution when the terminal is configured with multiple PS signal search spaces for the monitoring of a PDCCH-based PS signal (i.e., a PS signal PDCCH) is provided.

According to the solution provided in the example, the terminal device may determine M durations in a monitoring time period corresponding to each PS signal search space based on at least one configuration parameter corresponding to each PS signal search space in the K PS signal search spaces (specifically PDCCH search spaces).

Like example 1, M may be configured or predefined. When M is configured, the terminal device may receive the M value configured for the terminal device by the network device. Specifically, the M value may be contained in RRC signaling. Preferably, M=1.

Unlike example 1, there are multiple PS signal search spaces when K is greater than 1, namely the monitoring time period finally includes K*M durations.

Example 3: descriptions are also made for the condition of K>1. That is, a solution when the terminal device is configured with multiple PS signal search spaces for the monitoring of a PDCCH-based PS signal (i.e., a PS signal PDCCH) is provided.

Unlike example 2, the monitoring time period in the example includes M durations, M being an integer more than or equal to 1. That is, all the K PS signal search spaces correspond to the same M durations. For example, all the K PS signal search spaces adopt the same duration in case of M=1.

A length of each duration in the M durations may be one of:

a length of a maximum duration in at least one duration of the K PS signal search spaces;

a preset time point length;

a preset multiple of the maximum duration in the at least one duration of the K PS signal search spaces; or a preset multiple of the preset time point length.

Example 4: K=1, namely one PS signal search space is configured.

Unlike examples 1 to 3, the monitoring time period in the example includes N monitoring times in each PS signal search space of the K PS signal search spaces, N being an integer more than or equal to 1.

Since the example is for the scenario that K=1, the monitoring time period in the example includes N monitoring times for a configured PS signal search space.

Example 5: unlike example 4, descriptions are made for the condition of K>1. That is, a solution when the terminal is configured with multiple PS signal search spaces for the monitoring of a PDCCH-based PS signal (i.e., a PS signal PDCCH) is provided.

According to the solution provided in the example, the terminal device may determine N monitoring times in a monitoring time period corresponding to each PS signal search space based on at least one configuration parameter corresponding to each PS signal search space in the K PS signal search spaces (specifically PDCCH search spaces).

Example 6: descriptions are also made for the condition of K>1. That is, a solution when the terminal device is configured with multiple PS signal search spaces for the monitoring of a PDCCH-based PS signal (i.e., a PS signal PDCCH) is provided.

Unlike example 5, the monitoring time period in the example includes N monitoring times. That is, the same N monitoring times are adopted for monitoring no matter how many PS signal search spaces there are. Here, a method for determining the N monitoring times may include: randomly adopting N monitoring times (or, N valid monitoring times) in a monitoring time period in any PS signal search space or selecting some (one or more) of each monitoring time period in two or more PS signal search spaces to finally form N monitoring times. Of course, other manners may also be adopted, which will not be exhausted herein.

Example 7

Unlike all the above examples, the monitoring time period in the example includes L monitoring slots in each PS signal search space of the K PS signal search spaces, L being an integer more than or equal to 1.

The monitoring time period in the example includes L monitoring slots for a configured PS signal search space. Alternatively, in case that K is greater than 1, L monitoring slots are also determined for each PS signal search space, and the monitoring time period finally includes K*L monitoring slots.

L may be configured or predefined. When L is configured, the terminal device may receive L configured for it by the network device. Specifically, the L value may be contained in RRC signaling.

In an example, the monitoring times in the L monitoring slots are required to be valid monitoring times. Here, the definition about the validness in the valid monitoring time is the same as that in example 1, and will not be elaborated. Furthermore, if a monitoring time in a certain monitoring slot is invalid, the monitoring slot may not be counted.

Example 8: unlike example 7, the monitoring time period includes L monitoring slots. That is, the same L monitoring slots are adopted for monitoring no matter how many PS signal search spaces there are.

Example 9

Based on each above example, a third parameter is additionally introduced in the example. The terminal device may adjust the monitoring time period based on the third parameter to obtain an adjusted monitoring time period.

Specifically, the operation that the terminal device adjusts the monitoring time period based on the third parameter may further include that:

a monitoring time having a time interval away from a starting time point of the DRX ON time period being less than the third parameter in the monitoring time period is removed to obtain the adjusted monitoring time period.

That is, after the monitoring time period is obtained based on any one of examples 1 to 8, part of monitoring times may be removed from the monitoring time period based on the third parameter to obtain the adjusted monitoring time period.

The third parameter is configured to indicate minimum time required from the reception of the PS signal PDCCH by the terminal device to a starting time point of data transmission of the terminal device in the DRX ON time period. The third parameter may be recorded as PS_offsetMin. In addition, the third parameter may be preset, or configured by the network device for the terminal device, or specified in the protocol. Exhaustions are omitted herein.

The second processing unit 52 of the network device may adjust the monitoring time period based on the third parameter to obtain the adjusted monitoring time period no matter whether the third parameter is configured by the network side for the terminal device. Furthermore, the network device may determine the monitoring time period of the terminal device, thereby sending, through the second communication unit 52, the PS signal PDCCH to the terminal device at a corresponding monitoring position.

It can be seen that, with the adoption of the solutions, a corresponding monitoring time period may be determined according to at least one configuration parameter of a PS signal search space to further monitor a PS signal PDCCH in the monitoring time period. As such, a solution to the determination of a monitoring time period of a PS signal using a configuration parameter is provided, and a gap in related art is filled. Moreover, the solutions may be executed without adding any other parameter required to be configured based on an existing parameter, so that the increase of a signaling overhead between the terminal device and the network device is avoided.

Figure 5:
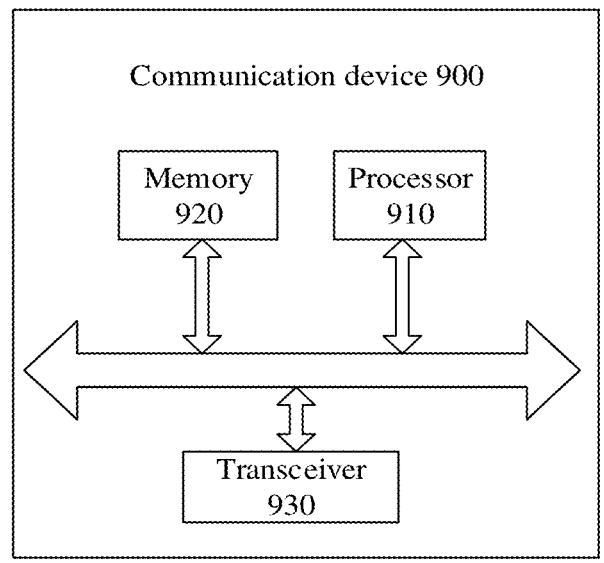
FIG. 5 is a composition structure diagram of a communication device according to an embodiment of the disclosure.

FIG. 5 is a schematic structure diagram of a communication device 900 according to an embodiment of the disclosure. The communication device in the embodiment may specifically be the terminal device in the abovementioned embodiment. The communication device 900 shown in FIG. 5 includes a processor 910. The processor 910 may call and run a computer program in a memory to implement the method in the embodiments of the disclosure.

Optionally, as shown in FIG. 5, the communication device 900 may further include memory 920. The processor 910 may call and run the computer program in the memory 920 to implement the method in the embodiments of the disclosure.

The memory 920 may be an independent device independent of the processor 910, or may be integrated into the processor 910.

Optionally, as shown in FIG. 5, the communication device 900 may further include a transceiver 930. The processor 910 may control the transceiver 930 to communicate with another device, specifically sending information or data to the other device or receiving information or data sent by the other device.

The transceiver 930 may include a transmitter and a receiver. The transceiver 930 may further include antennae. The number of the antennae may be one or more.

Optionally, the communication device 900 may specifically be the network device of the embodiments of the disclosure, and may implement corresponding flows implemented by the network device in each method of the embodiments of the disclosure. For simplicity, elaborations are omitted herein.

Optionally, the communication device 900 may specifically be the terminal device or network device of the embodiment of the disclosure, and may implement corresponding flows implemented by the mobile terminal/terminal device in each method of the embodiments of the disclosure. For simplicity, elaborations are omitted herein.

Figure 6:
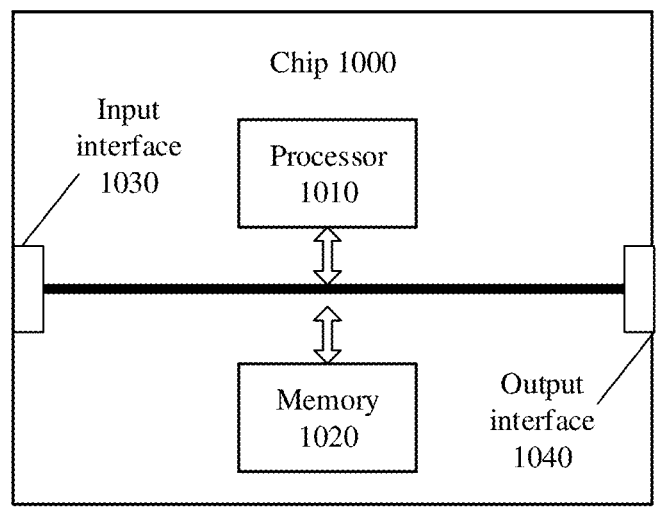
FIG. 6 is a schematic block diagram of a chip according to an embodiment of the application.

FIG. 6 is a schematic structure diagram of a chip according to another embodiment of the disclosure. The chip 1000 shown in FIG. 6 includes a processor 1010. The processor 1010 may call and run a computer program in a memory to implement the method in the embodiments of the disclosure.

Optionally, as shown in FIG. 6, the chip 1000 may further include memory 1020. The processor 1010 may call and run the computer program in the memory 1020 to implement the method in the embodiments of the disclosure.

The memory 1020 may be an independent device independent of the processor 1010 and may also be integrated into the processor 1010.

Optionally, the chip 1000 may further include an input interface 1030. The processor 1010 may control the input interface 1030 to communicate with another device or chip, specifically acquiring information or data sent by the other device or chip.

Optionally, the chip 1000 may further include an output interface 1040. The processor 1010 may control the output interface 1040 to communicate with the other device or chip, specifically outputting information or data sent by the other device or chip.

Optionally, the chip may be applied to the network device of the embodiments of the disclosure, and the chip may implement corresponding flows implemented by the terminal device in each method of the embodiments of the disclosure. For simplicity, elaborations are omitted herein.

It is to be understood that the chip mentioned in the embodiment of the disclosure may also be called a system-level chip, a system chip, a chip system, a system on chip, or the like.

It is to be understood that the processor in the embodiment of the disclosure may be an integrated circuit chip and has a signal processing capacity. In an implementation process, each step of the method embodiments may be completed by an integrated logical circuit of hardware in the processor or an instruction in a software form. The processor may be a general-purpose processor, a Digital Signal Processor (DSP), an Application Specific Integrated Circuit (ASIC), a Field Programmable Gate Array (FPGA) or another programmable logic device, a discrete gate or transistor logic device, and a discrete hardware component. Each method, step, and logical block diagram disclosed in the embodiment of the disclosure may be implemented or executed. The general-purpose processor may be a microprocessor, or the processor may be any conventional processor, etc. The steps of the method disclosed in combination with the embodiment of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM), and a register. The storage medium is in a memory. The processor reads information in the memory and completes the steps of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM, or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM, and a DR RAM. That is, the memory in the embodiments of the disclosure is intended to include, but not limited to, memories of these and any other proper types.

Figure 7:
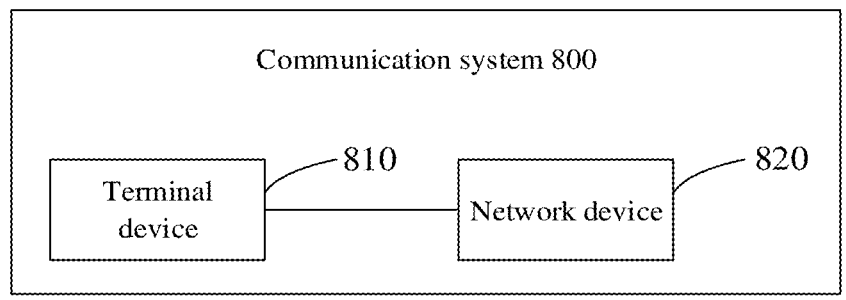
FIG. 7 is a second schematic diagram of an architecture of a communication system according to an embodiment of the application.

FIG. 7 is a second block diagram of a communication system 800 according to an embodiment of the application. As shown in FIG. 7, the communication system 800 includes a terminal device 810 and a network device 820.

The terminal device 810 may be configured to realize corresponding functions realized by UE in the method. The network device 820 may be configured to realize corresponding functions realized by the network device in the method. For simplicity, elaborations are omitted herein.

An embodiment of the disclosure also provides a computer-readable storage medium, which is configured to store a computer program.

Optionally, the computer-readable storage medium may be applied to a network device or terminal device in the embodiments of the disclosure. The computer program enables a computer to execute corresponding flows implemented by the network device in each method of the embodiments of the disclosure. For simplicity, elaborations are omitted herein.

An embodiment of the disclosure also provides a computer program product, which includes a computer program instruction.

Optionally, the computer program product may be applied to a network device or terminal device in the embodiments of the disclosure. The computer program instruction enables a computer to execute corresponding flows implemented by the network device in each method of the embodiments of the disclosure. For simplicity, elaborations are omitted herein.

An embodiment of the disclosure also provides a computer program.

Optionally, the computer program may be applied to a network device or terminal device in the embodiments of the disclosure, and runs in a computer to enable the computer to execute corresponding flows implemented by the network device in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed by hardware or software depends on specific applications and design constraints of the technical solutions. Professionals may realize the described functions for each specific application by use of different methods, but such realization shall fall within the scope of the disclosure.

Those skilled in the art may clearly learn about that specific working processes of the system, device, and unit described above may refer to the corresponding processes in the method embodiment and will not be elaborated herein for ease and briefness of description.

In some embodiments provided by the disclosure, it is to be understood that the disclosed system, device, and method may be implemented in another manner. For example, the device embodiment described above is only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, namely they may be located in the same place, or may be distributed to multiple network units. Part or all of the units may be selected to achieve the purposes of the solutions of the embodiments according to a practical requirement.

In addition, each function unit in each embodiment of the disclosure may be integrated into a first processing unit, or each unit may exist independently, or two or more than two units may also be integrated into a unit.

When realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product. The computer software product is stored in a storage medium, including a plurality of instructions configured to enable a computer device (which may be a personal computer, a server, a network device, etc.) to execute all or part of the steps of the method in each embodiment of the disclosure. The above-mentioned storage medium includes: various media capable of storing program codes such as a U disk, a mobile hard disk, a ROM, a RAM, a magnetic disk, or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for signal monitoring, comprising:
monitoring, by a terminal device, a Power Saving (PS) signal Physical Downlink Control Channel (PDCCH) in one or more than one monitoring time period prior to a Discontinuous Reception (DRX) ON time period and after a monitoring starting time point,
wherein the one or more than one monitoring time period is determined by at least one configuration parameter of each PS signal search space of K PS signal search spaces, K being an integer more than or equal to 1,
wherein the at least one configuration parameter comprises at least one of:
a first parameter configured to indicate the number of continuous monitoring slots in a cycle of a corresponding PS signal search space; or
a second parameter configured to indicate a starting symbol of a PS signal PDCCH monitoring time in a corresponding PS signal search space.

2. The method of claim 1, further comprising:
determining, by the terminal device, the monitoring starting time point based on a PS-offset and a starting time point of the DRX ON time period.

3. The method of claim 1, wherein the first parameter is a parameter Duration in the corresponding PS signal search space.

4. The method of claim 1, wherein the second parameter is a parameter monitoringSymbolsWithinSlot in the corresponding PS signal search space.

5. The method of claim 1, wherein each of the one or more than one monitoring time period comprises M durations in a PS signal search space corresponding to the monitoring time period, M being an integer more than or equal to 1.

6. The method of claim 5, wherein the number of slots, indicated by the first parameter, is the number of slots within one duration.

7. The method of claim 5, wherein all the M durations comprised in each of the one or more than one monitoring time period are complete durations.

8. The method of claim 5, wherein each of the one or more than one monitoring time period does not comprise a incomplete duration.

9. The method of claim 5, wherein M=1.

10. A terminal device, comprising:
a processor; and
a transceiver, connected to the processor and configured to monitor a Power Saving (PS) signal Physical Downlink Control Channel (PDCCH) in one or more than one monitoring time period prior to a Discontinuous Reception (DRX) ON time period and after a monitoring starting time point,
wherein the one or more than one monitoring time period is determined by at least one configuration parameter of each PS signal search space of K PS signal search spaces, K being an integer more than or equal to 1,
wherein the at least one configuration parameter comprises at least one of:
a first parameter configured to indicate the number of continuous monitoring slots in a cycle of a corresponding PS signal search space; or
a second parameter configured to indicate a starting symbol of a PS signal PDCCH monitoring time in a corresponding PS signal search space.

11. The terminal device of claim 10, wherein
each of the one or more than one monitoring time period comprises M durations in a PS signal search space corresponding to the monitoring time period, M being an integer more than or equal to 1.

12. The terminal device of claim 11, wherein each duration in the M durations comprises at least one monitoring time.

13. The terminal device of claim 11, wherein
each of the one or more than one monitoring time period comprises N monitoring times in a PS signal search space corresponding to the monitoring time period, N being an integer more than or equal to 1.

14. The terminal device of claim 12, wherein the monitoring time is a valid monitoring time.

15. The terminal device of claim 14, wherein when monitoring times of multiple PDCCH control resource sets (PDCCH CORESETs) that are monitored by the terminal device in active BWPs of one or more than one cell and have different spatial Quasi-Colocation (QCL)-typeD attributes are overlapped, the processor is configured to monitor the PS signal PDCCH at a monitoring time of a first CORESET among the multiple PDCCH CORESETs, wherein the monitoring time of the first CORESET is a valid monitoring time.

16. The terminal device of claim 10, wherein
there is a time interval away between each of the one or more than one monitoring time period and a starting time point of the DRX ON time period, the time interval being greater than or equal to a third parameter; or
the one or more than one monitoring time period does not comprises a monitoring time that has a time interval away from a starting time point of the DRX ON time period, the time interval being less than a third parameter.

17. The terminal device of claim 16, wherein the third parameter is configured to indicate minimum time required from reception of the PS signal PDCCH by the terminal device to a starting time point of data transmission of the terminal device in the DRX ON time period.

18. A method for signal sending, comprising:
sending, by a network device, a Power Saving (PS) signal Physical Downlink Control Channel (PDCCH) in one or more than one monitoring time period prior to a Discontinuous Reception (DRX) ON time period and after a monitoring starting time point,
wherein the one or more than one monitoring time period is determined by at least one configuration parameter of each PS signal search space of K PS signal search spaces, K being an integer more than or equal to 1,
wherein the at least one configuration parameter comprises at least one of:
a first parameter configured to indicate the number of continuous monitoring slots in a cycle of a corresponding PS signal search space; or
a second parameter configured to indicate a starting symbol of a PS signal PDCCH monitoring time in a corresponding PS signal search space.

19. The method of claim 18, further comprising:
determining, by the network device, the monitoring starting time point based on a PS-offset and a starting time point of the DRX ON time period.

20. The method of claim 18, wherein the first parameter is a parameter Duration in the corresponding PS signal search space.

21. The method of claim 18, wherein the second parameter is a parameter monitoringSymbolsWithinSlot in the corresponding PS signal search space.

22. The method of claim 18, wherein each of the one or more than one monitoring time period comprises M durations in a PS signal search space corresponding to the monitoring time period, M being an integer more than or equal to 1.

23. The method of claim 22, wherein each duration in the M durations comprises at least one monitoring time.

24. A network device, comprising:
a processor; and
a transceiver, connected to the processor and configured to send a Power Saving (PS) signal Physical Downlink Control Channel (PDCCH) in one or more than one monitoring time period prior to a Discontinuous Reception (DRX) ON time period and after a monitoring starting time point,
wherein the one or more than one monitoring time period is determined by at least one configuration parameter of each PS signal search space of K PS signal search spaces, K being an integer more than or equal to 1,
wherein the at least one configuration parameter comprises at least one of:
a first parameter configured to indicate the number of continuous monitoring slots in a cycle of a corresponding PS signal search space; or
a second parameter configured to indicate a starting symbol of a PS signal PDCCH monitoring time in a corresponding PS signal search space.

25. The network device of claim 24, wherein the processor is configured to:
determine the monitoring starting time point based on a PS-offset and a starting time point of the DRX ON time period.

26. The network device of claim 24, wherein
each of the one or more than one monitoring time period comprises M durations in a PS signal search space corresponding to the monitoring time period, M being an integer more than or equal to 1.

27. The network device of claim 26, wherein each duration in the M durations comprises at least one monitoring time.

28. The network device of claim 24, wherein
there is a time interval away between each of the one or more than one monitoring time period and a starting time point of the DRX ON time period, the time interval being greater than or equal to a third parameter; or
the one or more than one monitoring time period does not comprises a monitoring time that has a time interval away from a starting time point of the DRX ON time period, the time interval being less than a third parameter.

* * * * *